(12) United States Patent
Anderson et al.

(10) Patent No.: US 7,938,147 B2
(45) Date of Patent: May 10, 2011

(54) APPARATUS AND METHOD FOR AXIALLY TRANSFERRING FLUIDS TO A PLURALITY OF COMPONENTS

(75) Inventors: Mark L. Anderson, Carmel, IN (US); James Raszkowski, Indianapolis, IN (US); James A. Redelman, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 206 days.

(21) Appl. No.: 12/265,717

(22) Filed: Nov. 5, 2008

(65) Prior Publication Data

US 2010/0108166 A1    May 6, 2010

(51) Int. Cl.
*F16L 9/18* (2006.01)
(52) U.S. Cl. .......................... 138/114; 138/109; 138/42
(58) Field of Classification Search .................. 138/109, 138/114, 113, 112
See application file for complete search history.

(56) References Cited

U.S. PATENT DOCUMENTS

| | | | | |
|---|---|---|---|---|
| 3,509,917 A * | 5/1970 | Gartner | ............................ | 138/32 |
| 3,719,251 A * | 3/1973 | Hedrick | ......................... | 181/230 |
| 3,934,618 A * | 1/1976 | Henderson | ..................... | 138/114 |
| 3,938,233 A * | 2/1976 | Cannon | ..................... | 29/890.052 |
| 6,039,066 A * | 3/2000 | Selby | ............................ | 137/312 |
| 6,145,545 A * | 11/2000 | Hartnagel et al. | ............ | 138/113 |

* cited by examiner

*Primary Examiner* — Patrick F Brinson
(74) *Attorney, Agent, or Firm* — Barnes & Thornburg LLP

(57) ABSTRACT

An apparatus for axially transferring fluid may comprise an elongated shaft defining a first fluid passageway axially therethrough and a second fluid passageway from an outer surface thereof to the first fluid passageway. An elongated tube member defines an outer surface that is received within the first fluid passageway and a third fluid passageway axially therethrough. A plurality of axial channels are defined between the tube member and the first fluid passageway or along the tube member separately from the third fluid passageway. At least one of the plurality of axial channels define a first opening near one end thereof that receives fluid from a source of fluid and a second opening axially spaced apart from the first opening and that aligns with the second fluid passageway such that fluid may be transferred by the at least one fluid passageway from the source of fluid through the second fluid passageway.

22 Claims, 5 Drawing Sheets

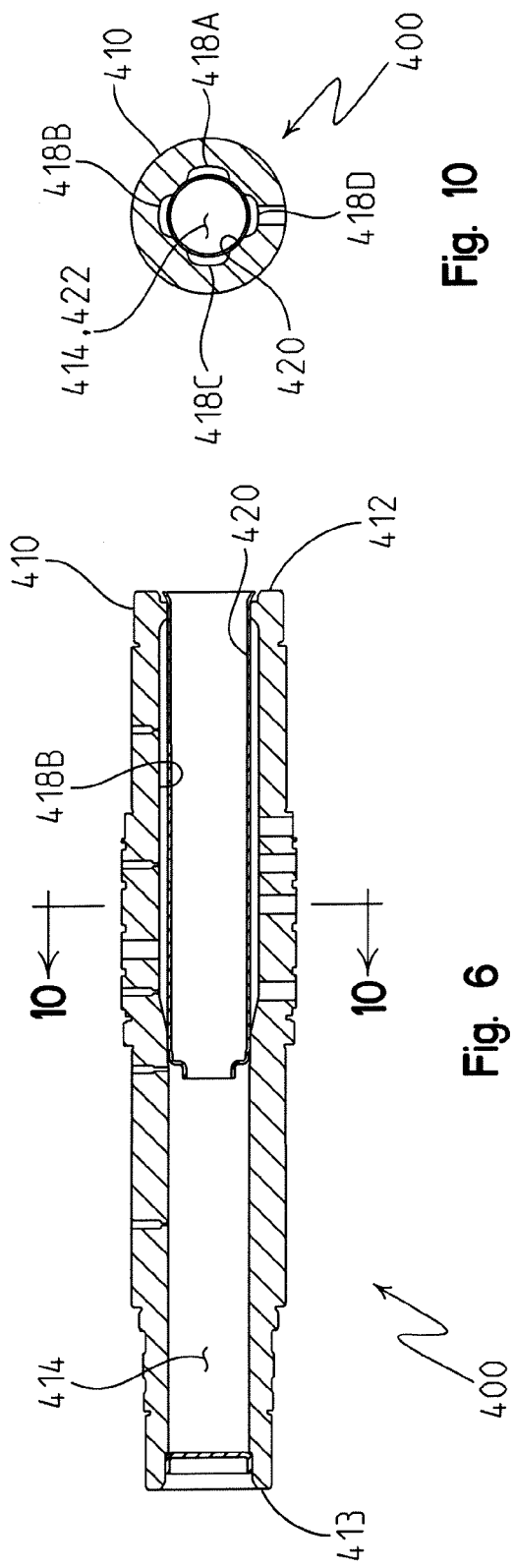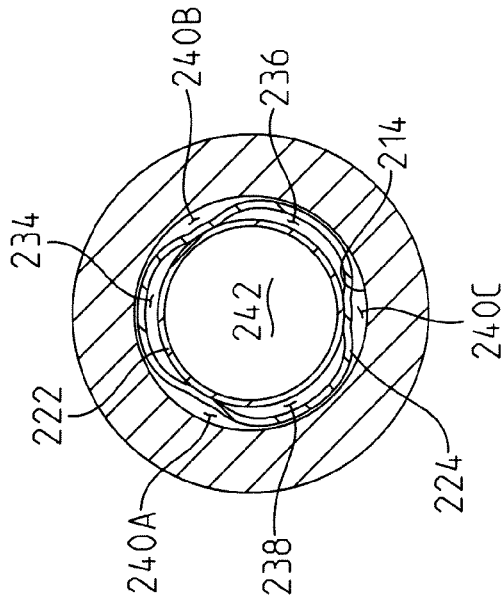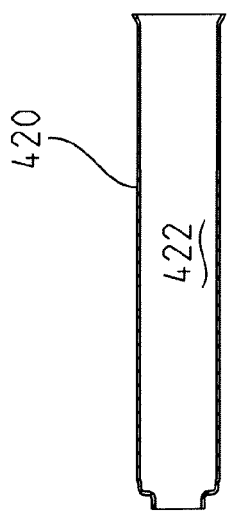

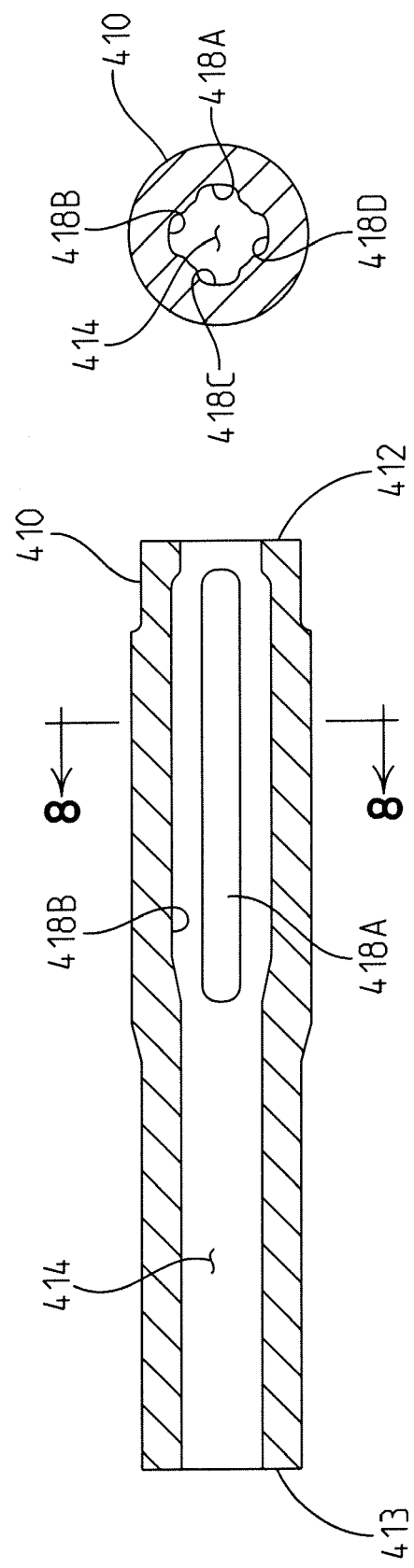

APPARATUS AND METHOD FOR AXIALLY TRANSFERRING FLUIDS TO A PLURALITY OF COMPONENTS

FIELD OF THE INVENTION

The present invention relates generally to structures and techniques for transferring fluids from one or more points to one or more other points along an elongated path, and more specifically to structures and techniques for axially transferring fluids to a plurality of components.

BACKGROUND

It is generally known to control certain types of actuators using pressurized fluid. As one specific example, it is generally known to control friction devices, e.g., clutches, in automatic transmissions using pressurized fluid. It is desirable in such applications to transfer fluid from one or more points in or into an apparatus or system to one or more other points in such an apparatus or system. It is further desirable to axially transfer such fluids in an apparatus or system along an elongated path to a plurality of components of the apparatus or system.

SUMMARY

The present invention may comprise one or more of the features recited in the attached claims, and/or one or more of the following features and combinations thereof. An apparatus for axially transferring fluid may comprise an elongated shaft defining a first fluid passageway axially therethrough and a second fluid passageway from an outer surface thereof to the first fluid passageway. An elongated tube member may define an outer surface and a third fluid passageway axially therethrough. The outer surface of the tube member may be configured to be received within the first fluid passageway of the shaft. A plurality of axial channels may be defined between the tube member and the first fluid passageway or defined by and along the tube member separately from the third fluid passageway. At least one of the plurality of axial channels may define a first opening near one end thereof that receives fluid from a source of fluid and a second opening axially spaced apart from the first opening and that aligns with the second fluid passageway such that fluid can be axially transferred by the at least one fluid passageway from the source of fluid through the second fluid passageway defined through the shaft.

BRIEF DESCRIPTION OF THE DRAWINGS

FIG. 5 is a cross-sectional view of the apparatus of FIG. 4 as viewed along section lines 5-5.

FIG. 6 is a cross-sectional diagram of yet another alternative embodiment of an apparatus for axially transferring fluids along an elongated path to a plurality of components.

FIG. 7 is a cross-sectional view of the elongated path of the apparatus of FIG. 6.

FIG. 8 is a cross-sectional view of the elongated path of FIG. 7 as viewed along section lines 8-8.

FIG. 9 is a cross-sectional view of the tube member illustrated in FIG. 6.

FIG. 10 is a cross-sectional view of the apparatus of FIG. 6 as viewed along section lines 10-10.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
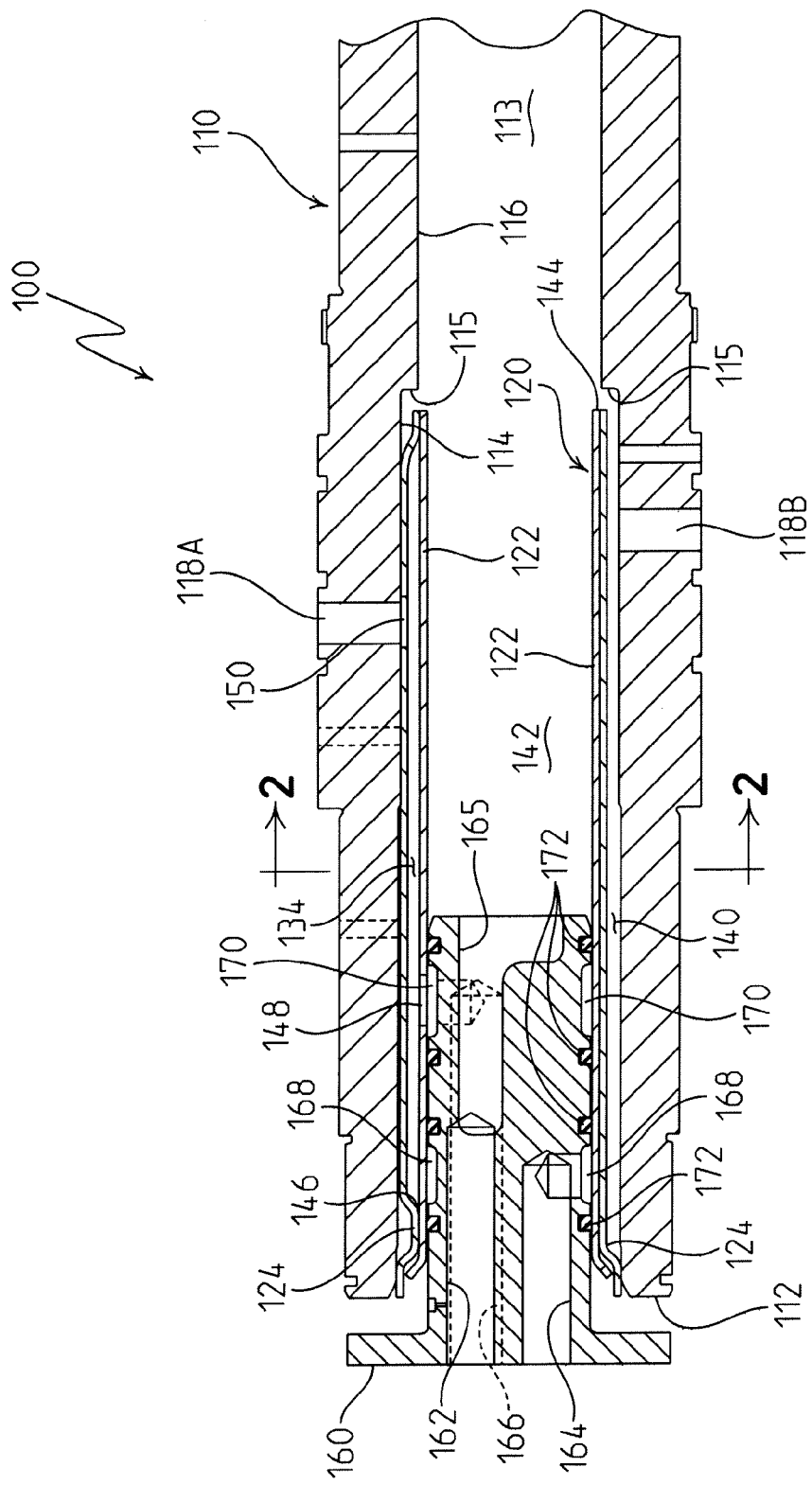
FIG. 1 is a cross-sectional diagram of a portion of an automatic transmission showing one illustrative embodiment of an apparatus for axially transferring fluids along an elongated path to a plurality of transmission components.

Referring now to FIG. 1, a cross-sectional diagram is shown of a portion of an automatic transmission showing one illustrative embodiment of an apparatus 100 for axially transferring fluids along an elongated path to a plurality of transmission components. In the illustrated embodiment, the elongated path takes the form of a shaft 110 defining a bore 113 therethrough. Between one end 112 of the shaft 110 and a wall portion 115 of the bore 113, the bore 113 defines one diameter 114, and between the wall portion 115 and an opposite end (not shown) of the shaft 110, the bore 113 defines another diameter 116, wherein the diameter 114 is generally larger than the diameter 116. Illustratively, the diameter 114 is sized to accommodate axial insertion of a tube member 120 therein. Along the shaft 110, a number of bores extend through an exterior surface thereof to the bore 113. In the illustrated embodiment, two such bores 118A and 118B are identified. In one embodiment, the shaft forms one component of a transmission for a mobile vehicle, and the bores 118A and 118B each lead to a fluid input of a fluid-controlled friction device, e.g., a friction clutch, although this disclosure contemplates embodiments in which the apparatus 100 is configured to axially transfer fluid to other components. In any case, the shaft 110 is illustratively formed of a conventional metal, combination of metals or a metal composite, although this disclosure contemplates other embodiments in which the shaft 110 is formed of other materials and/or material combinations.

Figure 2:
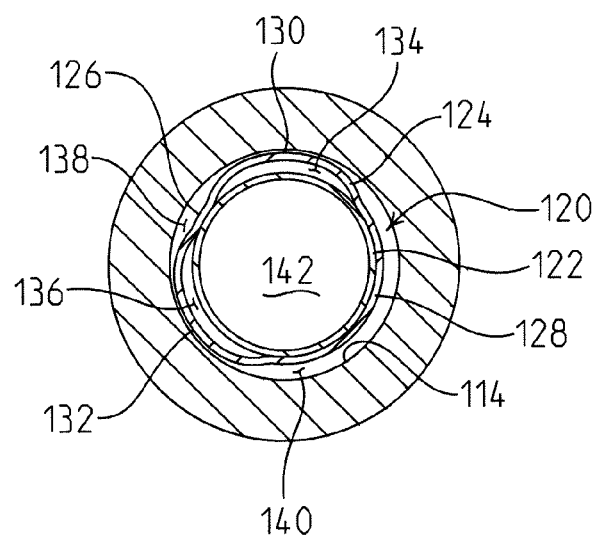
FIG. 2 is a cross-sectional view of the apparatus of FIG. 1 as viewed along section lines 2-2.

The tube member 120 is an elongated tubular structure that is axially received within the bore 113, e.g., between the end 112 of the shaft 110 and the wall portion 115 as illustrated in FIG. 1. Referring to FIG. 2, a cross-sectional view of one embodiment of the tube member 120 is shown as viewed through section lines 2-2 of FIG. 1. In the illustrated embodiment, the tube member 120 is formed of a conventional hollow, metal tube or bar stock with an inner surface of one tube 124 selectively joined to an outer surface of another tube 122. Generally, the inner surface of the tube 124 has a diameter that is larger than the diameter of the outer surface of the tube 122. In the illustrated embodiment, one portion 126 of the inner surface of the tube 124 is longitudinally joined to and along a corresponding portion of the outer surface of the tube 122, and another portion 128 of the inner surface of the tube 124 is longitudinally joined to and along a corresponding portion of the outer surface of the tube 122. Between the portions 126 and 128, the remaining portions 130 and 132 of the tube 124 and the corresponding portions of the outer surface of the tube 122 define separate, i.e., not fluidly connected, longitudinal or axial channels or passageways 134 and 136 respectively therebetween that extend longitudinally or axially along the tube member 120.

Figure 3:
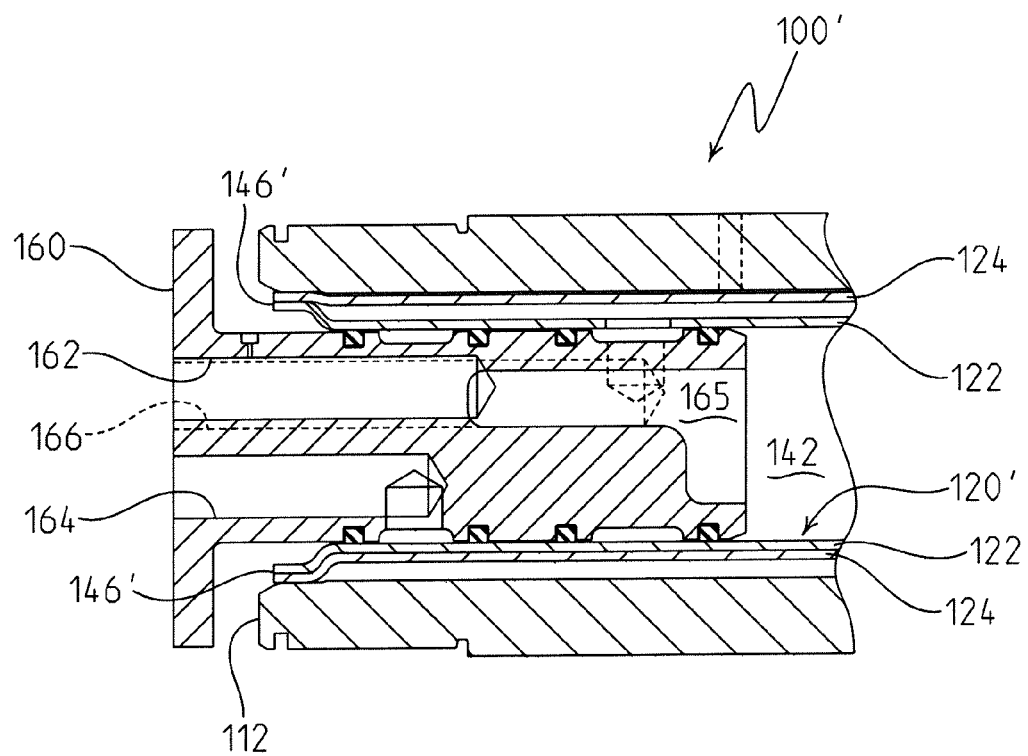
FIG. 3 is a cross-sectional diagram similar to FIG. 1 and illustrating an alternate embodiment of the tube member illustrated in FIG. 1.

As illustrated in FIG. 1, the ends of the tubes 122 and 124 are circumferentially joined at 144 and 146. In the illustrated embodiment, the ends of the tube 122 and 124 are joined by deforming the opposite ends of the tube 124 toward the corresponding ends of the tube 122 and then joining the ends of the tubes 122 and 124 using one or more conventional joining techniques. In an alternate embodiment of the apparatus 100' illustrated in FIG. 3, the ends of the tubes 122 and 124 of the tube member 120' adjacent to the end 112 of the shaft 110 are joined at 146' by deforming the end of the tube 122 toward the end of the tube 124 and the joining the ends of the tubes 122 and 124 using one or more conventional joining techniques.

The tube member 120 is illustratively formed by selectively bending or pressing the tube 124, and the tubes 122 and 124 may be axially and circumferentially joined using any one or more conventional joining media and/or techniques. Examples include, but are not limited to, welding, spot welding, laser welding, using one or more adhesives and/or conventional fastening members, or the like.

As further illustrated in FIG. 2, the portions 126 and 128 of the outer tube 124 each define a separate axial channel or passageway 138 and 140 respectively between the corresponding portion 126/128 and the inner diameter 114 of the bore 113 of the shaft 110. The tube member 120 is illustratively press-fit into the bore 113 as illustrated in FIG. 1, and in this embodiment, fluid may pass between the channels 138 and 140. In this embodiment, as illustrated in FIG. 2, the tube member 120 and shaft 110 thus cooperate to axially define four separate fluid channels or passageways therethrough; the two channels 134 and 136 defined between the tubes 122 and 124, the channels 138 and 140 defined between the tube 124 and the inner diameter 114 of the bore 113 of the shaft 110 and a passageway 142 defined axially through the tube 122. In an alternate embodiment, sealing structures may be positioned between the portions 130 and 132 of the tube 124 and the inner diameter 114 of the bore 113 of the shaft 110 so that fluid may not pass between the channels 138 and 140. In this embodiment, the tube member 120 and the shaft 110 thus cooperate to axially define 5 separate fluid channels or passageways therethrough, the four channels 134, 136, 138 and 140, and the passageway 142. Although the channels 134 and 136 are illustrated in FIG. 2 as being asymmetrically positioned about the outer surface of the tube 122, it will be understood that the channels 134 and 136 may alternatively be positioned symmetrically about the outer surface of the tube 122. It will be further understood that while the tube member 122 illustrated in FIG. 2 defines two channels 134 and 136 between the tubes 124 and 122, this disclosure contemplates that more or fewer such channels may be alternatively formed between the tubes 122 and 124.

Referring again to FIG. 1, the inner tube 122 defines an opening 148 into the channel 134, and the outer tube 124 also defines an opening 150 into the channel 134 that is aligned with the bore 118A formed through the shaft 110. Fluid may thus pass axially along the tube member 120 through the channel 134 between the openings 148 and 150.

The apparatus 100 further includes a manifold 160 that defines a number of fluid passageways therethrough. In the illustrated embodiment, for example, a fluid passageway 162 extends into the manifold 160 and is fluidly coupled to another fluid passageway 165 that is fluidly coupled to the bore 113 of the shaft 110. Another fluid passageway 164 extends into the manifold 160 and is fluidly coupled to another fluid passageway 168 that extends at least partially radially about the manifold 160. Yet another fluid passageway 166 extends into the manifold 160 and is fluidly coupled to still another fluid passageway 170 that likewise extends at least partially radially about the manifold 160 separately from the fluid passageway 168. In the illustrated embodiment, the fluid passageway 170 is aligned with the opening 148 formed through the tube 122 and extending into the channel 134. In the illustrated embodiment, fluid may thus be routed from the fluid passageway 166 of the manifold 160 through the bore 118A of the shaft 110 via the fluid passageways 170, 148, 134, 150 and 118A as illustrated in FIG. 1.

In the illustrated embodiment, the manifold 160 is held stationary and the combination shaft 110 and tube member 120 rotate together about the manifold 160. The manifold 160 includes a number of conventional sealing members, e.g., sealing rings, 172 that are positioned as illustrated in FIG. 1 to keep fluids from axially leaking from the fluid passageways 168 and 170 along the inner surface of the tube 122. It will be understood, however, that this disclosure contemplates embodiments in which the combination shaft 110 and tube member 120 are held stationary and the manifold 160 rotates relative thereto, in which the manifold 160 and tube member 120 are stationary and the shaft 110 rotates about the combination, in which the shaft 110 is stationary and the combination manifold 160 and tube member 120 rotate about the shaft 110, or in which the combination shaft 110 and tube member 120 and the manifold 160 are all stationary.

In one specific embodiment of the apparatus 100 illustrated in FIG. 1, at least one of the channels 134 and 136 is illustratively used to route pressurized fluid to one or more friction devices mounted to or fluidly coupled to the shaft 110, and the channels 138 and 140 and the fluid passageway 142, as well as perhaps one of the channels 134 and 136, are illustratively used to route lubricating fluid to one or more friction devices, and/or to the tube member 120 and shaft 110 combination and/or to one or more other components.

Figure 4:
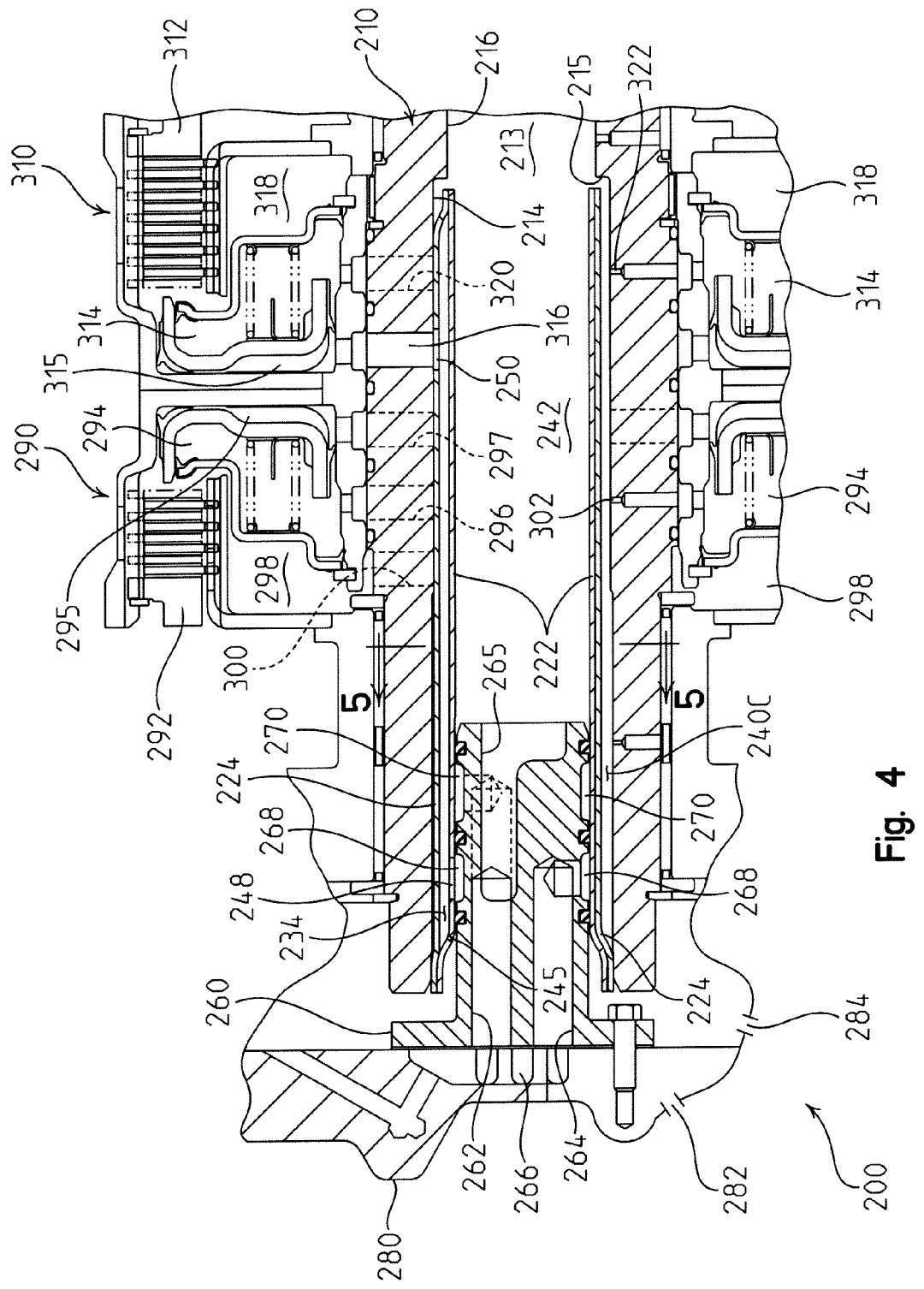
FIG. 4 is a cross-sectional diagram of a portion of an automatic transmission showing an alternative embodiment of an apparatus for axially transferring fluids along an elongated path to a plurality of transmission components.

Referring now to FIG. 4, a cross-sectional diagram is shown of a portion of an automatic transmission showing another illustrative embodiment of an apparatus 200 for axially transferring fluids along an elongated path to a plurality of transmission components. In FIG. 5, a cross-sectional view of the tube member 220 is shown. Many of the components in the apparatus 200 are identical to those illustrated and described hereinabove with respect to the apparatus 100, and like numbers (plus 100) are used in FIG. 4 to identify like components. In the embodiment illustrated in FIGS. 4 and 5, the tube member 220 differs from the tube member 120 in that the tube member 220 defines an additional fluid channel or passageway between the tubes 222 and 224, for a total of three such fluid channels or passageways 234, 236 and 238, and an additional fluid channel or passageway between the outer tube 224 and the inner diameter 214 of the bore 213 of the shaft 210 for a total of three such fluid channels or passageways 240A, 240B and 240C. The inner diameter of the tube 222 defines an additional fluid channel or passageway 242. In the illustrated embodiment, the inner tube 222 additionally defines an air bleed hole 245 therethrough.

In the embodiment illustrated in FIG. 4, a fluid source 180 is mounted to the manifold 260. Fluid entering a fluid port 282 may enter the fluid passageway 264 of the manifold 260, and fluid entering the fluid port 284 may enter either of the fluid passageways 262 and 266. In the illustrated embodiment, two friction devices 290 and 310 are mounted to the outer surface of the shaft 210, and the shaft 210 defines a number of bores therethrough between the outer and inner surface thereof for fluid coupling of the devices 290 and 310 to the bore 213 of the shaft 210. For example, the friction device 290 includes a friction apparatus 292, e.g., a clutch pack, which is fluidly coupled to a bore 300 via a fluid chamber 298. The bore 300 thus fluidly couples the friction apparatus 292 to the bore 213 of the shaft 210. The friction device 290 further includes a friction device piston chamber 295 which is fluidly coupled to a bore 297 that fluidly couples the chamber 295 to the bore 213 of the shaft 210. The friction device 290 further includes a balance cavity 294 which is fluidly coupled to a bore 296 that fluidly couples the cavity 294 to the bore 213 of the shaft 210. The balance cavity 294 is also fluidly coupled to the bore 213 via a balance cavity feed bore 302. The friction device 310 likewise includes a friction apparatus 312, e.g., a clutch pack, and a friction device piston chamber 315. The chamber 315 is fluidly coupled to a bore 316 that fluidly couples the chamber 316 to the bore 213 of the shaft 210. The friction device 310 further includes a balance cavity 318 which is fluidly coupled to a bore 320 that fluidly couples the cavity 318 to the bore 213 of the shaft 210. The balance cavity 318 is also fluidly coupled to the bore 213 via a balance cavity feed bore 322.

In the embodiment illustrated in FIG. 4, the opening 248 defined by the tube 222 to the fluid channel 234 is aligned with the fluid passageway 268 and the opening 250 defined by the tube 224 into the fluid channel 234 is aligned with the bore 316 so that fluid entering the port 282 and the fluid passageway 264 is routed axially along the tube member 222 to the clutch piston chamber 315 via the fluid passageway 268, the fluid channel 234 and the bore 316. The fluid channel 234 is thus used to transmit fluid, e.g., oil, from the stationary manifold 260 to the friction device piston of the friction device 310 for actuation control of the friction device 310. Another of the fluid channels 236 or 238 is used in like manner to transmit fluid, e.g., oil, from the stationary manifold 260 to the friction device piston of the friction device 290 for actuation control thereof. The third fluid channel 236 or 238 illustratively serves as a fluid overflow cavity that reduces the inner diameter of each annulus of rotating fluid, e.g., oil, to centrifugally balance the friction device apply pistons. For example, in the illustrated embodiment, the friction device balance cavities of the friction devices, e.g., 290 and 310, are fed from pressurized lubrication oil in the passages, e.g., the fluid channel 240C, between the tube member 220 and the inner surface 214 of the bore 213 of the shaft 210 (e.g., which is supplied via the fluid passageway 262 and through the fluid passageway or channel 242 of the tube member 220). Once the balance cavities 294 and 314 are filled, the fluid, e.g., oil, then flows through bores (not shown) formed through the shaft 210 and into the third fluid channel 236 or 238. The fluid, e.g., oil, then exits the third fluid channel 236 or 238 into one or more of the chambers 298 and 318 to cool one or more of the corresponding friction apparatuses 292 and 310. This reduced diameter of the annulus of rotating balance fluid, e.g., oil, creates a higher pressure head opposing the pressure head created on the apply side of the friction device piston which allows the shaft 210 to rotate at a higher speed before the friction device apply piston begins to stroke. A higher shaft speed allows lower torque to be transmitted through the shaft 210 which reduces gear and shaft loads as well as a corresponding size of such components.

Referring now to FIGS. 6-10, cross-sectional diagrams are shown of yet another alternative embodiment of an apparatus 400 for axially transferring fluids along an elongated path to a plurality of components. The apparatus 400 may be configured for use in either of the embodiments illustrated in FIGS. 1-5, or may alternatively be configured for use in one or more other applications. In the illustrated embodiment, as shown in FIG. 6, the apparatus 400 includes a shaft 410 having opposite ends 412 and 413, and defining a bore 414 therethrough. An elongated tube member 420 is configured to be axially received within the bore 414 of the shaft 410 such that one end of the tube member 420 is positioned adjacent to the end 412 of the shaft 410.

As illustrated in FIGS. 6-8, the portion of the bore 414 that receives the tube member 420 defines a number of axial channels therein. Referring to FIG. 8, for example, the inner surface 414 of the shaft 410 defines four channels 418A-418D therein that are symmetrically spaced from each other about the circumference of the bore 414. It will be appreciated, however, that more or fewer such channels, symmetrically spaced or otherwise, may alternatively be formed in the inner surface 414 of the shaft 410.

The tube member 420 is, as illustrated in FIG. 9, a single, hollow tube defining a bore 422 therethrough. In the illustrated embodiment, the tube member 420 is circular in cross-section and has constant diameter inner and outer surfaces. The apparatus 400 is assembled by inserting the tube member 420 into the bore 414 at the end 412 of the shaft 410. The tube member 420 and the shaft 410 are configured such that the outer surface of the tube member 420 forms an interference fit with the bore 414 defined through the shaft 410, and the terminal ends of the tube member 420 form seals with the bore 414. The outer surface of the tube member 420 and the surface of the bore 414 form separate fluid transfer cavities or channels, e.g., 418A-418D, through which fluid can be axially transferred.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, while the various embodiments of the shaft 110, 210 and 410 and the tube member 120, 220 and 420 are illustrated as being generally circular in cross-section, this disclosure contemplates that any of the embodiments of the shaft and the tube member may alternatively have cross-sections other than circular. Moreover, it will be understood that the fluid channels or passageways defined between the inner and outer tubes in the embodiments illustrated and described with respect to FIGS. 1-5 may be symmetrically or non-symmetrically positioned about the tube members, and that the channels formed in the shaft of the embodiment illustrated and described with respect to FIGS. 6-10 may by symmetrically or non-symmetrically positioned about the inner surface of the shaft.

What is claimed is:

1. An apparatus for axially transferring fluid, comprising:
an elongated shaft defining a first fluid passageway axially therethrough and a second fluid passageway extending through the elongated shaft from an outer surface of the elongated shaft into the first fluid passageway,
an elongated tube member defining a third fluid passageway axially therethrough, the elongated tube member received within the first fluid passageway of the elongated shaft, and
a plurality of channels defined by and extending axially along one of the elongated tube member separate from the third fluid passageway and the first fluid passageway between an inner surface of the first fluid passageway and an outer surface of the elongated tube member, one of the plurality of channels defining a first opening near one end thereof that receives fluid from a source of fluid and a second opening axially spaced apart from the first opening and that aligns with the second fluid passageway such that fluid can be axially transferred by the one of the plurality of channels from the first opening through the second fluid passageway defined through the elongated shaft.

2. The apparatus of claim 1 further comprising a manifold defining a fourth fluid passageway having one end configured to be fluidly coupled to the source of fluid and an opposite end fluidly coupled to the first opening of the at least one of the plurality of channels such that fluid from the source of fluid can flow through the fourth fluid passageway to the at least one of the plurality of channels.

3. The apparatus of claim 2 wherein the manifold is received within the third fluid passageway of the elongated tube member,
and wherein a combination of the elongated shaft and the elongated tube are rotatable relative to the manifold.

4. The apparatus of claim 3 wherein the manifold is stationary, and the combination of the elongated shaft and the elongated tube are configured to rotate together about the manifold.

5. The apparatus of claim 2 wherein the elongated shaft defines a fourth fluid passageway separate from the second fluid passageway and extending through the elongated shaft from an outer surface of the elongated shaft into the first fluid passageway,
and wherein another one of the plurality of channels defines a first opening near one end thereof that receives fluid from the source of fluid and a second opening axially spaced apart from the first opening of the another one of the plurality of channels that aligns with the fourth fluid passageway such that fluid can be axially transferred by the another one of the plurality of channels from the first opening of the another one of the plurality of channels to lubricate one or more components of an automatic transmission through the fourth fluid passageway defined through the elongated shaft.

6. The apparatus of claim 2 wherein the elongated shaft defines a fourth fluid passageway separate from the second fluid passageway and extending through the elongated shaft from an outer surface of the elongated shaft into the first fluid passageway,
and wherein one end of the third fluid passageway receives fluid from the source of fluid such that fluid from the source of fluid can be axially transferred by the third fluid passageway to lubricate one or more components of an automatic transmission through the fourth fluid passageway defined through the elongated shaft.

7. The apparatus of claim 2 wherein the second fluid passageway is fluidly coupled to a component of an automatic transmission.

8. The apparatus of claim 7 wherein the component of an automatic transmission comprises a friction device mounted to the elongated shaft,
and wherein the fluid axially transferred by the one of the plurality of channels is pressurized fluid.

9. The apparatus of claim 8 wherein the friction device comprises a clutch pack.

10. The apparatus of claim 2 wherein the elongated shaft defines a fourth fluid passageway separate from the second fluid passageway and extending through the elongated shaft from an outer surface of the elongated shaft into the first fluid passageway,
and wherein another one of the plurality of channels defines a first opening near one end thereof that receives fluid from the source of fluid and a second opening axially spaced apart from the first opening of the another one of the plurality of channels that aligns with the fourth fluid passageway such that fluid can be axially transferred by the another one of the plurality of channels from the first opening of the another one of the plurality of channels through the fourth fluid passageway defined through the elongated shaft.

11. The apparatus of claim 10 wherein the second fluid passageway is fluidly coupled to a first component of an automatic transmission and the fourth fluid passageway is fluidly coupled to a second component of the automatic transmission.

12. The apparatus of claim 11 wherein the first component of an automatic transmission comprises a first friction device mounted to the elongated shaft and the second component of the automatic transmission comprises a second friction device mounted to the elongated shaft.

13. The apparatus of claim 12 wherein the friction device comprises a first clutch pack and the second friction device comprises a second clutch pack.

14. The apparatus of claim 10 wherein still another one of the plurality of channels defines a first opening near one end thereof that receives fluid from the source of fluid and a second opening axially spaced apart from the first opening of the still another one of the plurality of channels such that fluid can be axially transferred by the still another one of the plurality of channels from the first opening of the still another one of the plurality of channels to lubricate one or more components of an automatic transmission through the second opening of the still another one of the plurality of channels.

15. The apparatus of claim 10 wherein one end of the third fluid passageway receives fluid from the source of fluid such that fluid from the source of fluid can be axially transferred by the third fluid passageway to lubricate one or more components of an automatic transmission.

16. The apparatus of claim 1 wherein the elongated tube member defines the plurality of channels separate from the third fluid passageway, the elongated tube member comprising:
a first elongated tube defining the third fluid passageway axially therethrough and an outer surface having a first diameter, and
a second elongated tube having an outer surface received within the first fluid passageway of the elongated shaft and an inner surface defining a second diameter that is greater than the first diameter of the outer surface of the first elongated tube,
wherein two or more portions of the inner surface of the second elongated tube are separately joined longitudinally along the outer surface of the first elongated tube to define between each of the two or more joined portions one of the plurality of channels between the outer surface of the first elongated tube and the inner surface of the second elongated tube.

17. The apparatus of claim 16 wherein each of the two or more portions define one of the plurality of channels between the outer surface of the of the second elongated tube and an inner surface of the first fluid passageway between each of the plurality of channels defined between the outer surface of the first elongated tube and the inner surface of the second elongated tube.

18. The apparatus of claim 16 wherein the elongated tube member is press fit into the first fluid passageway of the elongated shaft such that fluid can pass between each of the plurality of channels defined between the outer surface of the second elongated tube and the inner surface of the first fluid passageway.

19. The apparatus of claim 16 wherein fluid is prevented from passing between each of the plurality of channels defined between the outer surface of the second elongated tube and the inner surface of the first fluid passageway by sealing structures positioned between the inner surface of the first fluid passageway and the outer surfaces of the second tube that define each of the plurality of channels defined between the outer surface of the first elongated tube and the inner surface of the second elongated tube.

20. The apparatus of claim 16 wherein the inner surface of the second elongated tube is circumferentially joined to the outer surface of the first elongated tube adjacent each end of the first and second elongated tubes with the first and second openings off the at least one of the plurality of channels positioned between circumferentially joined portions of the first and second elongated tubes.

21. The apparatus of claim 1 wherein the inner surface of the first fluid passageway defines the plurality of channels therein, and wherein the outer surface of the elongated tube member forms an interference fit with the first fluid passageway and terminal ends of the elongated tube member form seals with the first fluid passageway such that the outer surface of the elongated tube member and the inner surface of the first fluid passageway together form the plurality of channels through which fluid can be axially transferred.

22. The apparatus of claim 21 wherein the elongated tube member comprises a single, hollow, elongated tube having an outer surface defining the outer surface of the elongated tuber member and defining the third fluid passageway therethrough.

* * * * *